United States Patent [19]
Azzarelli et al.

[11] Patent Number: 6,140,963
[45] Date of Patent: Oct. 31, 2000

[54] AMBIGUITY REMOVAL AND ANGLES-OF-ARRIVAL ESTIMATION FOR RADIALLY POLARIZED CONFORMAL ARRAYS

[75] Inventors: Teodoro Azzarelli, Los Angeles; Paul Kwon, Chatsworth; Ephraim Mendelovicz, Northridge, all of Calif.

[73] Assignee: Science and Applied Technology, Inc., San Diego, Calif.

[21] Appl. No.: 09/287,256

[22] Filed: Apr. 7, 1999

Related U.S. Application Data

[60] Provisional application No. 60/083,707, Apr. 30, 1998.

[51] Int. Cl.[7] .............................. G01S 5/04; H01Q 21/06
[52] U.S. Cl. ........................................... 342/442; 342/362
[58] Field of Search .................................... 342/362, 424, 342/437, 442

[56] References Cited

U.S. PATENT DOCUMENTS

| | | |
|---|---|---|
| 4,963,889 | 10/1990 | Hatch . |
| 5,016,206 | 5/1991 | Shinonaga .......................... 364/715.11 |
| 5,189,429 | 2/1993 | Guard ....................... 342/424 |
| 5,218,361 | 6/1993 | Avila . |
| 5,296,861 | 3/1994 | Knight . |
| 5,572,220 | 11/1996 | Cai .......................................... 342/442 |
| 5,936,575 | 8/1999 | Azzarelli et al. ........................ 342/362 |

*Primary Examiner*—Mark Hellner
*Attorney, Agent, or Firm*—Michael Blaine Brooks

[57] ABSTRACT

A method for resolving the angular ambiguity inherent in the differential phase measurements of a source of electromagnetic signal by an interferometric system of antenna elements. Three or more independent differential phase measurements are acquired between predetermined pairs of antenna elements. The ambiguous solutions to each of the differential phase measurements are represented as a group of equally-spaced, parallel lines. The points of intersection between two groups of lines represent ambiguous solutions to the system of equations from which the true angles-of-arrival may be determined. The set of ambiguous solutions is evaluated using the remaining differential phase measurements. The most probable solution to the system of equations is determined by minimizing cost functions with the following embodiments: tightest cluster of intersecting lines; maximum likelihood estimation; and voltage reconstruction comparisons with measured voltages.

16 Claims, 7 Drawing Sheets

AMBIGUITY REMOVAL AND ANGLES-OF-ARRIVAL ESTIMATION FOR RADIALLY POLARIZED CONFORMAL ARRAYS

This appln claims benefit of provisional appln 60/083,707 Apr. 30, 1998.

BACKGROUND OF THE INVENTION

This invention relates generally to the field of direction finding techniques by which the angles-of-arrival of incident radiation are determined using an array of radiation-sensing elements. More particularly, the present invention relates to a method for the efficient and accurate determination of the phase ambiguity that takes the form of a whole number of full cycles that corrupt an interferometric measurement due to the differential path length between individual radiation detecting elements and a common source of electromagnetic radiation. The recovery of the unambiguous phase term permits the determination of the unambiguous angular direction to the radiation source.

Interferometric direction finding systems frequently use three or more sensing elements separated by fixed distances and a receiving network for determining the frequency and phase of the incident radiation. The elements may be part of either a RF antenna array or an acoustical array depending on whether a radar or sonar application is intended. An interferometric baseline is the shortest distance between sensing elements. Where the baseline is less than half a wavelength of the frequency of interest, the comparison of phase measurements permits the unambiguous determination of the angle from which the radiation or acoustical waveform originated in the propagation plane.

Where the baseline exceeds half the wavelength of the highest frequency, the interferometric phase measurement results in two or more possible angles-of-arrival. Such an ambiguity takes the form of an integer multiple of $2\pi$ in the differential phase measurement because a realizable receiving system is incapable of determining phase angles beyond 360 degrees. Where a narrow-bandwidth system is used, the angular ambiguity can be avoided by making the system baseline less than a half wavelength of the highest frequency. In such a system, the accuracy is generally poor due to the presence of thermal noise that acts to lower the signal-to-noise ratio and accordingly degrades the accuracy of the angle-of-arrival measurement. Where greater accuracy is required or the system is wide-band, it is often necessary to increase the baseline. A wide baseline system is one in which the baseline is greater than one-half the wavelength of the signal. When applying a wide baseline system, one trades the increased accuracy against the necessity of distinguishing the resulting ambiguous angles-of-arrival that are the natural products of sensing elements spaced apart by several multiples of the wavelength of the signal.

The relevant prior art methods used for resolving angular ambiguities appear to be U.S. Pat. No. 5,218,361 to Avila and U.S. Pat. No. 5,296,861 to Knight. U.S. Pat. No. 5,218,361 to Avila uses spatial changes in the antenna element orientation by rotating the interferometric antenna array. The rotation of the array is necessary to acquire phase data at multiple orientations in order to construct a simultaneous set of equations. Where the phase data are acquired by successive measurements at a rate that yields a system of equations wherein each equation is a function of the same ambiguity number, the system of equations can be combined to eliminate the dependence on the ambiguity number and thus the unambiguous angles-of-arrival can be determined. In contrast to Avila, the present invention uses a plurality of antenna elements in a fixed configuration and orientation relative to the signal source whereby the ambiguity may be determined instantaneously over a full range of array orientations without the need to rotate the array. Furthermore, the present invention has the additional advantage that the phase data need not necessarily be restricted in such ways as to require that each phase measurement be a function of the same ambiguity number.

U.S. Pat. No. 5,296,861 to Knight applies the maximum likelihood estimation techniques to the relative phases of GPS carrier signals so as to derive the attitude angles of receiving platforms and resolves GPS carriers relative phases ambiguities with integer programming branch and bound techniques. The Knight platform attitude solution using GPS is the inverse of the emitter angle of arrival problem of interest in direction finding. The platform attitude problem is characterized by multiple emitters of exactly known positions. The Direction Finding problem handles separate emitters as separate concerns. The ambiguously measured angle between the baselines and the AOA from the emitter/satellites is a common feature. In DF the unambiguous measured angle is the final output, whereas in the platform attitude measurement it is only a means to an end.

The preceding discussion provides motivation for the appreciable need of a method for the correction of the ambiguity in the determining of the angular position of a source of electromagnetic radiation. In overcoming the limitations of the prior art, the present invention fulfills the need for a closed-form solution that is both computationally efficient and robust, providing accurate results in the presence of noise.

SUMMARY OF THE INVENTION

The object of the present invention is to improve upon the existing and well established interferometric techniques applied in estimating the angles-of-arrival of incident radiation as measured between pairs of antenna elements by reducing the number of ambiguous angles-of-arrival candidate solutions which must be numerically evaluated. The invention as described herein constitutes an optimum method applicable to an array of four or more co-polarized or polarization-diverse antenna elements.

The invention, in both the first and second embodiments, includes as a first step the acquisition of three or more independent differential phase measurements using an interferometric array of antenna elements. In the absence of noise, at least three phase measurements are required in order to overcome the ambiguity and uniquely determine the angles-of-arrival. In the presence of noise, more phase measurements are necessary to increase the probability of determining the true angles-of-arrival. The frequency of the incoming signal is also measured and the corresponding wavelength determined.

The next step is to generate a set of tentative solutions. These candidate solutions are permissible solutions to a system of two equations derived from two differential phase measurements. These equations are linear equations relating two cartesian angles-of-arrival u and v. Here u and v represent two direction cosines of the incoming signal direction and are related to the two polar angles-of-arrival, $\theta$ and $\phi$, where $u=\sin\theta\cos\phi$ and $v=\sin\theta\sin\phi$. For purposes of this invention, the candidate solutions when represented graphically reside at the points within the unit circle on the cartesian u,v plane where "phase lines" from two independent differential phase measurements intersect. Each line represents an ambiguous solution to a given interferometric phase equation; each equation is the result of a differential phase measurement. In a large baseline system, each independent differential phase measurement gives rise to a "group" or "family" of phase lines, each being parallel and equally-spaced from one another. The lines of a family differ as to the assignment of the ambiguity number. Each additional independent differential phase measurement gives rise to a new family of lines, each mapping into the cartesian plane with a different slope and interline spacing. Theoretically, one line generated from each of the groups of lines should converge on a single point. In contrast, where actual phase measurements are acquired the convergence will be defocused by noise. In the absence of a single point of convergence the true solution may be difficult to distinguish from other regions in which the lines only coincidentally converge, giving rise to "false solutions."

The present invention teaches in the subsequent step that from each of the one or more remaining groups of lines beyond the two selected previously, a line is discerned passing closest to the intersections established in the preceding step. This line is sometimes referred to as the "nearest-neighbor" to the intersection. A predicted position of this line is determined based upon the presumption that the ambiguous solution is the true solution. The degree to which the phase line is displaced from its predicted position is therefore related to the probability that this point is the true solution. The solution for a complete set of ambiguity numbers is derived from the nearest-neighbor calculation with the condition that the candidate solution is the true solution.

In the next step, the true solution is estimated by determining the degree to which multiple lines converge on a single point. In the first embodiment the amount by which a phase line is displaced from the location of the candidate is calculated for the nearest-neighbor from each group of lines beyond the initial two from which the intersection was established. Each candidate solution is evaluated in this manner in order to quantify the likelihood of the intersection corresponding to the true solution. Where the lines converge to the greatest degree, the sum of the square of the displacements is a minimum. This point, taken to be the most probable solution, is used to resolve the angular ambiguity and determine the direction angles for the source of the incoming signal. In the second embodiment, a maximum likelihood estimate is made for each ambiguous solution. The maximum likelihood optimization that follows is a function of the two yet-to-be-determined angles-of-arrival, and is calculated for a particular assignment of the ambiguity numbers. The solution that results in the maximum joint probability density function is selected to be the most probable solution. From that solution the direction angles are determined.

In the third embodiment, specifically applicable to polarization-diverse antenna systems, the voltages at various antenna elements are calculated as a function of the measured power and phase. These "reconstructed" voltages are then compared to the voltages measured directly from the elements, and where they are inconsistent the initial solution is removed from the set of ambiguous solutions. To qualify as the one true solution, the measured voltage at each antenna element, $\alpha_i$, must correlate with the reconstructed voltage for that same element.

DESCRIPTION OF THE PREFERRED EMBODIMENTS

In conventional angle-of-arrival interferometry, electrical phase and frequency measurements are made using two or more pairs of antenna elements which are further processed in order to determine the phase difference with which the direction of the emitter source is determined. Classical interferometry is based on the relation that exists between the phase difference as measured between antenna elements, which corresponds to the difference in path length traveled by the incoming wave-front as it impinges upon the particular antenna element pair. This relationship is well understood but can suffer from a fundamental angular ambiguity caused by the inability to measure angles outside a cycle of 360 degrees, a problem that arises when the path length from a common source to each of the antenna elements differs by one or more full wavelengths.

Figure 1:
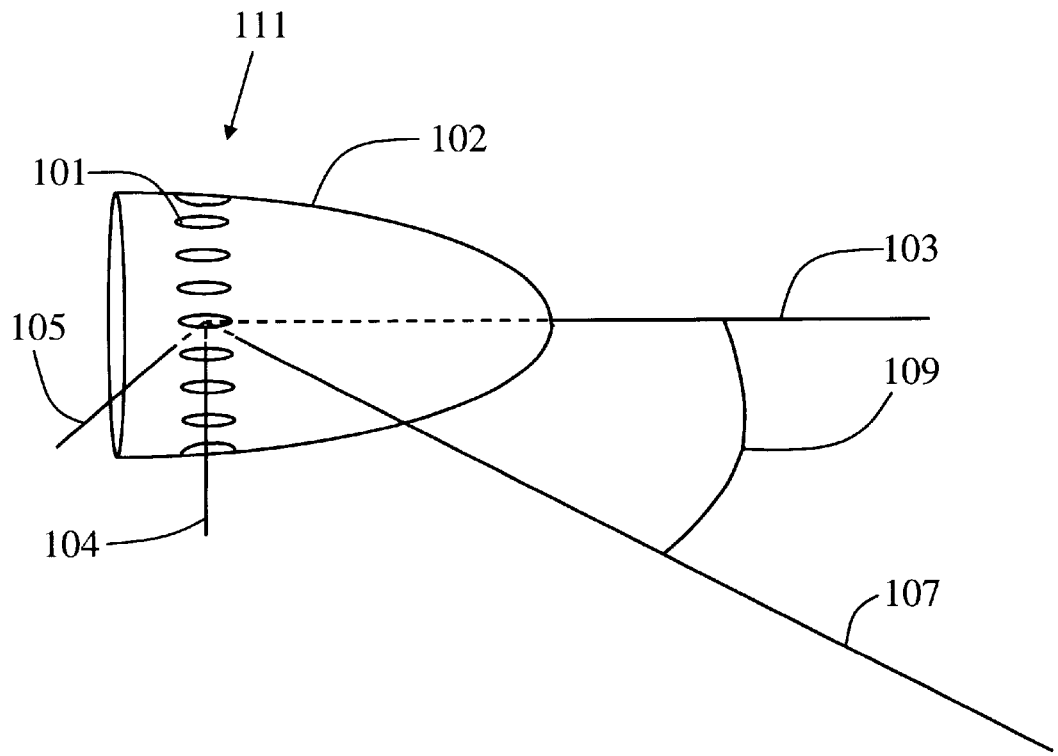
FIG. 1 illustrates the orientation of an array of radiation sensing devices with angles-of-arrival to a source of radiation emission.

As illustrated by the array 111 of FIG. 1, it is often desirable to place a number of substantially similar antenna elements in a circular configuration. A typical radiation element 101 is shown mounted on a surface 102, where a plurality of radiation-sensing elements is distributed in the form of a circular planar array defined by the principal axis 103 that is normal to the array plane. For purpose of explanation, the present invention is equally applicable to arrays of co-polarized elements as well as arrays of elements of diverse polarizations with the one exception detailed below.

In polarization diverse interferometry, an additional complicating factor is due to the polarization diversity that occurs when pairs of antennas are used in which the polarization of the elements are non-parallel. The invention explained herein is equally applicable to systems employing antenna elements with a diversity of polarizations provided that the polarization-induced effects are accounted and compensated for within the process. One such method of compensation is described in the teachings of the pending patent application Ser. No. 09/023,381 which when practiced reduces the interferometric representation to that of classical interferometry.

One skilled in the art recognizes that the present invention may also be adapted to other array configurations, including 1-, 2-, and 3-dimensional arrays of elements with appropriate modifications to the representative mathematical models. The fundamental requirement is that the system be capable of acquiring three or more independent differential phase measurements, which for purposes of this array can be acquired simultaneously by four or more elements.

The antenna array 111 forms a ring around the principal axis 103. With the principal axis defining a forward horizontal directional axis, 104 is a down directional axis and 105 is a "to the right" directional axis. A vector directly from the center of the antenna array 111 to the source of the radiated signal is designated the line-of-sight 107 vector, and is the directional vector of the emitting source, not shown, relative to the antenna array 111. The angle created by the lines 103 and 107 is 109. The angle 109 is, θ, one of the two polar angles-of-arrival.

Figure 2:
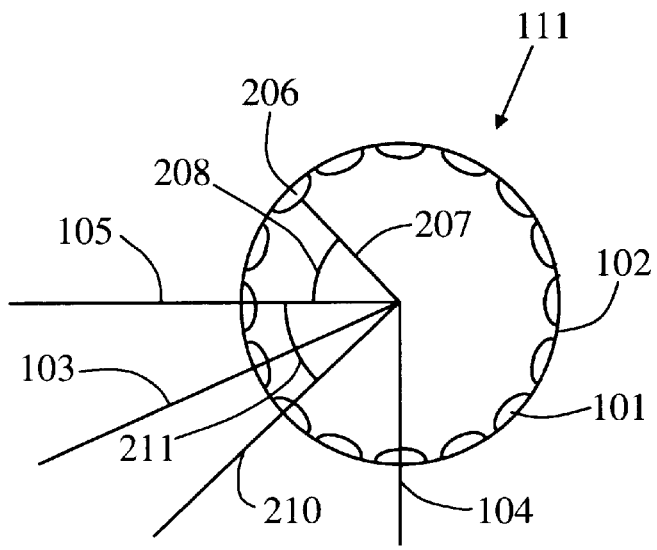
FIG. 2 illustrates a transverse cut through the plane of the radiation sensing array.

FIG. 2 illustrates the transverse view of the antenna array 111 cut through the plane coinciding with the axis 104 and axis 105. The vector from the origin of the body-relative reference frame to the phase center of the element 206 is designated as 207. The angle 208 between the axis 105 and the line 207 is the position angle of the ith element, $\alpha_j$. The projection of the line of sight vector 107 onto the plane defined by lines 104 and 105 is line 210. The angle 211 created by the axis 105 and the projection 210 is the second polar angle-of-arrival, φ.

The phase difference, ψ, between any pair of antennas of a planar array organized in a circular geometry, after being reduced to a classical interferometric representation, is expressed as $$\psi = \frac{2\pi R}{\lambda}\sin(\theta)\{\cos(\phi - \alpha_j) - \cos(\phi - \alpha_i)\} - 2k\pi \quad [1]$$

where R is the system radius as measured to the electric phase center of the antenna elements, and λ is the wavelength of the received radiation signal. The angles θ and φ represent the unknown polar angles-of-arrival of the incoming wave as measured from the origin of the coordinate system located at the intersection of lines 103, 104, and 105. The unknown value k is the ambiguity number representing the integral number of wavelengths, either positive or negative, by which the distance from the source to an element at angular position $\alpha_j$ differs from the distance of the source to element $\alpha_i$.

After the linearization of Equation 1, the interferometric equation can be represented as $$a_n u + b_n v + \psi_n + 2k_n \pi = 0 \quad [2]$$

where u=sin(θ)cos(φ), v=sin(θ)sin(φ), and $a_n$ and $b_n$ are functions of the baseline, wavelength, and angular detector position, but independent of θ and φ. The subscript n denotes a single pair of antenna elements, specifically the elements located at positions $\alpha_i$ and $\alpha_j$ on the antenna array 111, with which the differential phase $\psi_n$ is measured. The substitution of u and v may therefore represent the direction angles in a rectilinear coordinate system, herein referred to as the cartesian plane, without any loss of generality.

Consider first a single phase measurement using one pair of elements, which gives rise to a single phase relationship, that is, Equation 2 where n=1. There are numerous possible values of the ambiguity number, $k_n$, that satisfy the phase equation, each corresponding to a unique combination of u and v in the cartesian plane. The number of permissible values of $k_n$ is governed by the geometrical configuration, specifically the baseline, the field of view of the array of radiation detecting elements of interest, and the wavelength of the received signal.

Figure 3:
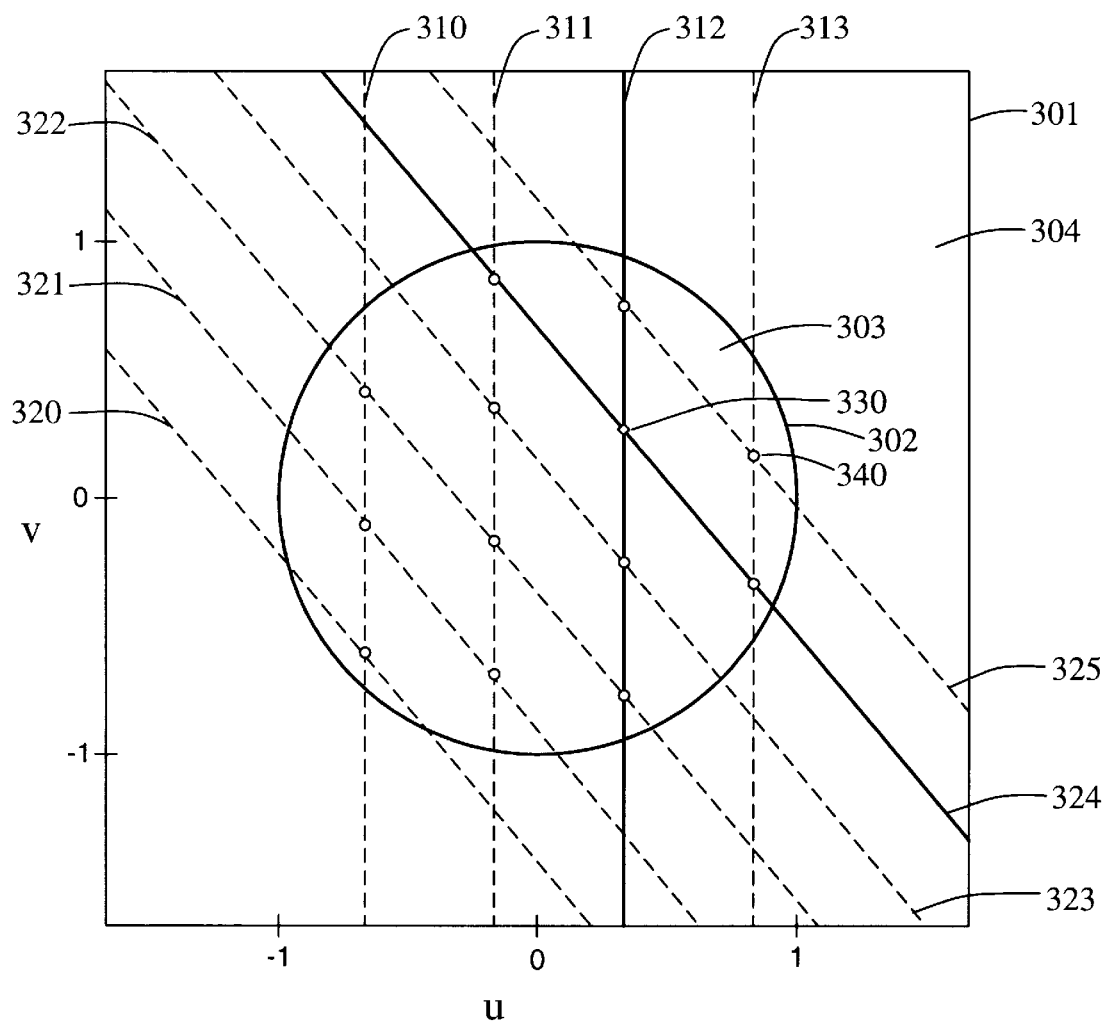
FIG. 3 illustrates the ambiguity that occurs within the boundary of the unitary circle in the cartesian u,v plane when only two differential phase measurements are used.

Referring to FIG. 3, the unit circle 302 signifying the field of view has an origin which coincides with the origin of the u,v plane 301. For a given combination of θ and φ, a differential phase measurement may be represented by one or more lines that intersect the interior region 303 of the unit circle 302 located in the cartesian plane 301. Where the detector pair is separated by less than half a wavelength of the incident signal 107 there exists only a single line in the cartesian plane 301 that passes through the interior 303 of the circle 302 signifying the absence of angular ambiguity with respect to that phase measurement. However, there will exist two or more lines satisfying Equation 2 when the differential phase measurement is made with antenna elements separated by a distance greater than a half wavelength. For example, the lines 310, 311, 312, and 313 comprise a "family" of lines, each line satisfying Equation 2 for a particular phase measurement, $\psi_n$. The lines differ only in the particular assignment of the ambiguity number, $k_n$. A second differential phase measurement produces a second family of lines, examples of which are illustrated with lines 320 through 325, consecutively inclusive.

The lines that comprise each family are parallel and equally spaced, and each line represents a permissible integer value of the ambiguity number. Ambiguity numbers that produce lines falling outside of the unit circle 302 into region 304 without intersecting region 303 have no corresponding physical manifestation and are therefore ignored. Additional independent phase measurements produce additional families of parallel lines, but at different slopes and interline spacings. Intersection 340 depicts the typical intersection of a line from each of the two families of lines represented. Each such intersection represents a candidate solution. In the absence of a third phase measurement the numerous candidate solutions would have an equal probability of being the one true solution, and therefore indistinguishable from intersection 330 which represents the point of convergence in the cartesian plane 301 corresponding to the true values of θ and φ.

Note that any single point in the region 303 may correspond to a radiation signal originating from either the region in front of or behind the plane created by the lines 104 and 105. The primary signals of interest are those originating from the forward field of view of the antenna array, specifically the 2π solid angle defined by 0≤θ≤π/2. Since any signal from the aft region of the array 111 defined by π/2<θ≤π will also map into the unit circle, it may give rise to a second form of ambiguity. Such an ambiguity and its remedy are well understood by those skilled in the art. For purposes of the present discussion it is presumed this particular form of ambiguity has been addressed and the signal is known to originate from either the forward or aft region of the antenna array 111.

Figure 4:
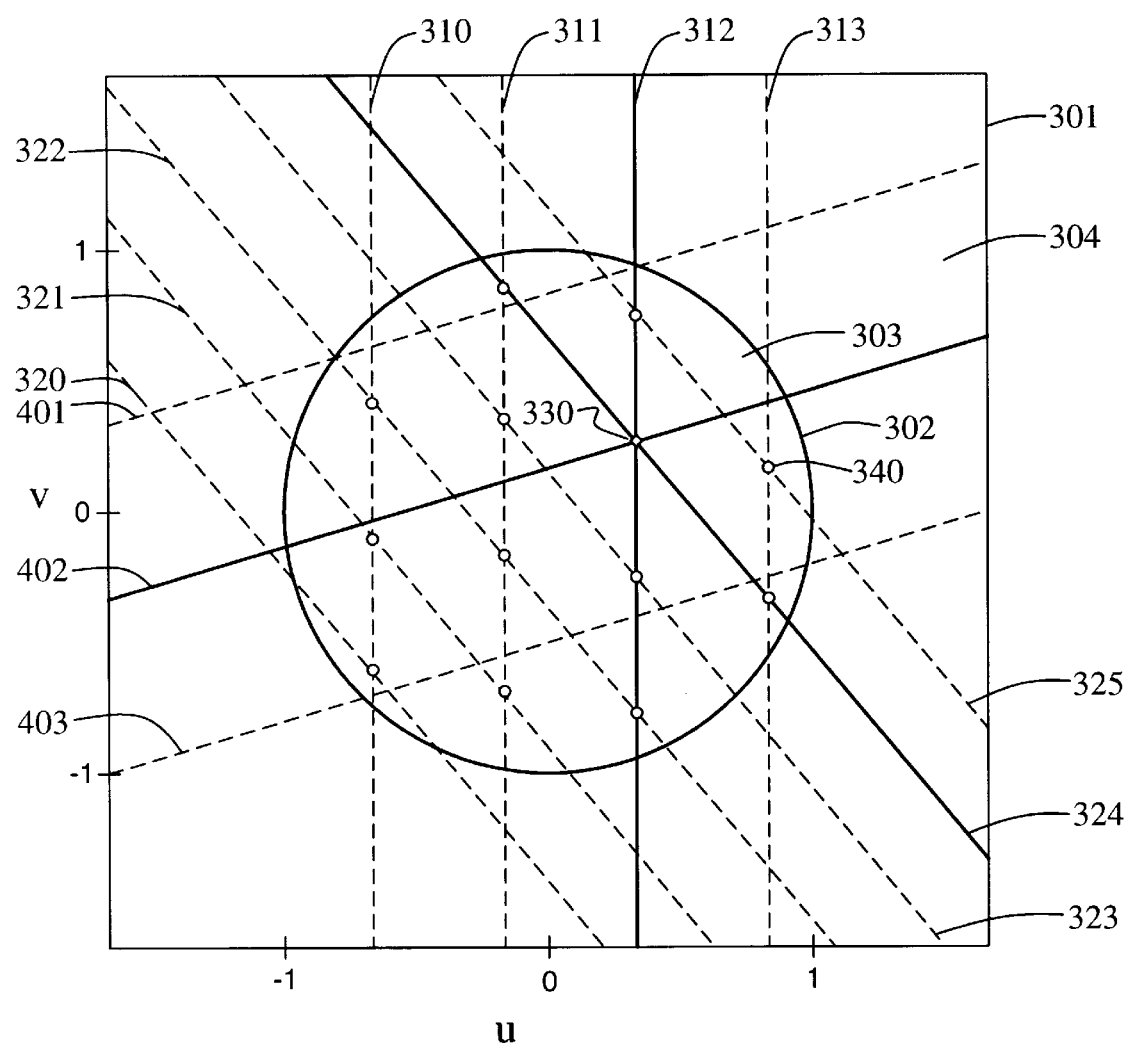
FIG. 4 illustrates the theoretical resolution of the ambiguity, in the absence of noise, when three families of lines are used.

Referring to FIG. 4, intersection 330 can be determined, for example, with three independent phase measurements in the absence of noise. With the addition of lines 401, 402, and 403, the intersection 330 represents a single point of convergence between a line from each of the groups of lines. Intersection 330 therefore is the unique solution to the system of equations, specifically Equation 2 for n=1, 2, and 3. Intersection 340 and similar ambiguous intersections are clearly distinguishable from the true solution at intersection 330.

Figure 5:
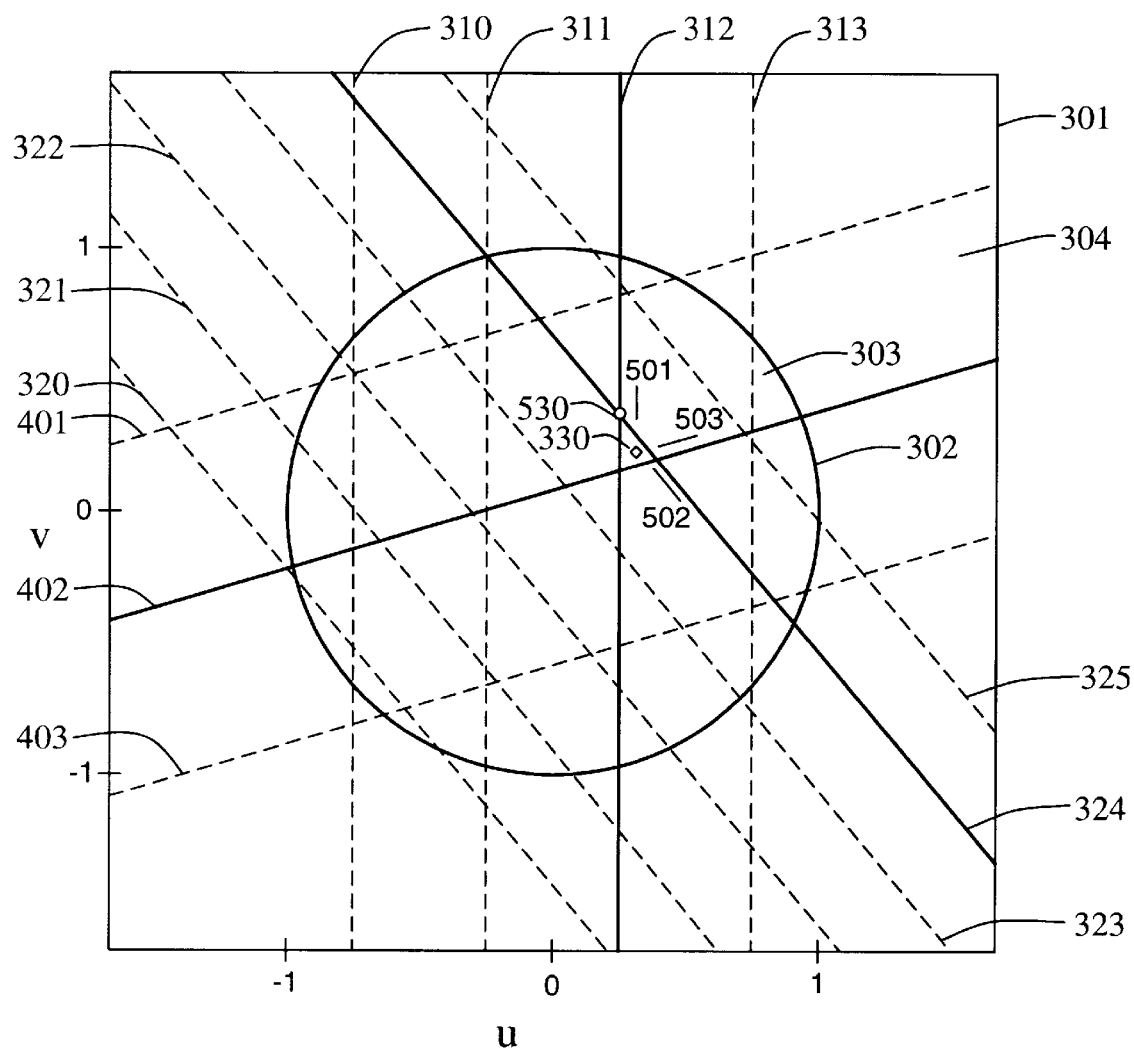
FIG. 5 illustrates the absence of the convergence of the lines of the true solution in the presence of noise.

In contrast to the noiseless situation illustrated in FIG. 4, FIG. 5 illustrates the case where the phase measurements are degraded by noise, which in turn causes each family of lines to be displaced in such a manner as to destroy the convergence required for determining the values of u and v with certainty. The point of convergence created by lines 312, 324, and 402 illustrated in FIG. 5 (which are displaced distances 501, 502 and 503, respectively) is defocused, thereby making the true solution at point 330 difficult to distinguish from other regions of loosely intersecting lines, i.e. false solutions to the system of interferometric equations. The number of false solutions is related to the wavelength of the incoming RF signal, the diameter of the circular array or effective baselines, the selection of detector pairs, and the signal-to-noise ratio. Note that in the presence of noise the intersection 530, which is otherwise a candidate solution to the system of equations, is displaced a finite distance from the true angles-of-arrival at point 330.

Below is described a new process useful for estimating the true values of u and v in the presence of noise using a plurality of independent phase measurements derived from four or more antenna elements. Using this approach the values of u and v, and therefore $\theta$ and $\phi$, can be ascertained in a computationally efficient manner while retaining a high degree of accuracy.

Figure 6:
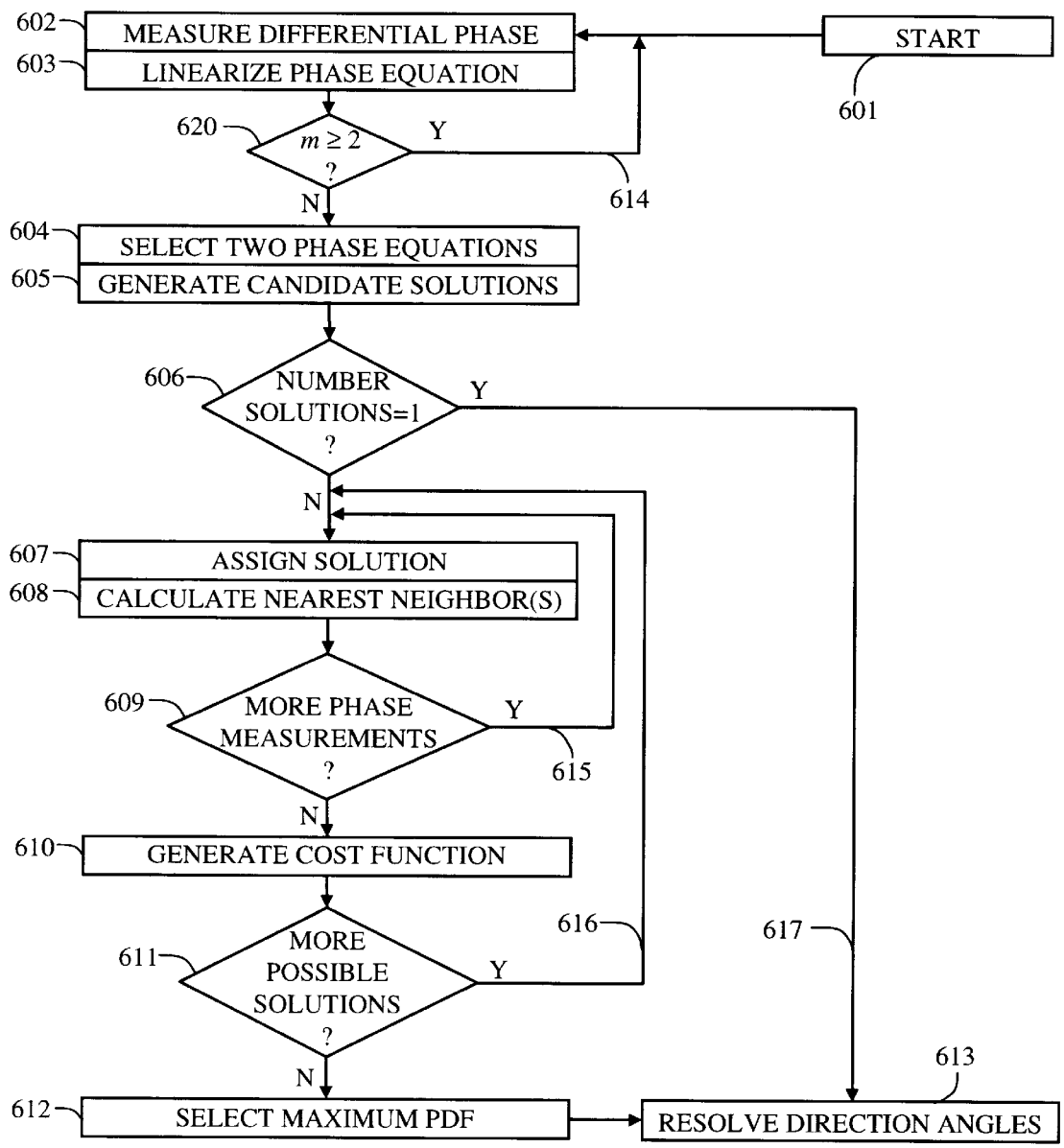
FIG. 6 is a flow chart of the Maximum Likelihood Estimation process according to the present invention for removing the angular ambiguity in the determination of the angles-of-arrival.

FIG. 6 illustrates the steps necessary to practice the present invention. The first step, shown in block 602, is to acquire a first differential phase measurement between two predetermined antenna elements. With the wavelength of the incoming signal determined, the first differential phase equation can be linearized as shown in block 603. The total number of differential phase measurements acquired is three or more, signified by loop 614. The first differential phase measurement is acquired during the first pass through block 602, and the second two or more upon satisfaction of the condition presented in block 620, yielding a total of N=m+1 phase measurements. While three phase measurements are required to practice the present invention, additional independent phase measurements increase the probability of determining the unambiguous angles-of-arrival with a greater degree of accuracy. Referring to Equation 2, each choice of detector pairs produces an independent equation denoted by the subscript n. The resulting system of equations, after solving for the ambiguity number, is represented as $$k_n = [a_n b_n]\begin{bmatrix} u \\ v \end{bmatrix} - \frac{\psi_n}{2\pi} \quad n = 1, 2, \cdots, N \quad [3]$$

where N represents the total number of independent phase measurements. Note that the system of equations represented by Equation 3 has two unknowns more than there are equations, namely N ambiguity numbers as well as u and v. Generally in such a situation, the resolution of the ambiguity requires that each of the ambiguous candidate solutions be evaluated using an appropriate form of a probabilistic estimation. The present invention presents three embodiments with which the ambiguous solutions may be excluded and the ambiguity resolved.

As shown in block 604, the next step in the method for the resolution of the ambiguity is to select two of the N≧3 equations from which to establish an initial set of ambiguous candidate solutions in block 605. The candidate solutions represent the solutions to the sub-system of two equations that fall within the field of view of the antenna system. Referring briefly to FIG. 3, this set comprises the points of intersection between lines 310 through 313, consecutively inclusive, with lines 320 through 325, consecutively inclusive, that fall within the interior region 303. In the decision block 606, the question posed is whether there exists a single solution to the sub-system of two phase equations. Where the answer is affirmative, there is no ambiguity and the direction angles may be determined directly. In the alternative where there exists two or more equally probable solutions, each must be evaluated individually to determine its likelihood of being the one true solution. In block 607, a single point selected from the initial set of candidate solutions is selected for consideration. The selection of a point refers specifically to the assignment of $k_1$ and $k_2$.

The execution of block 608 begins with the substitution of u and v in terms of $k_1$ and $k_2$, yielding an expression for the angles-of-arrival in terms of the hitherto unknown ambiguity numbers:

$$\begin{bmatrix} u \\ v \end{bmatrix}_{k1,k2} = -\begin{bmatrix} a_1 & b_1 \\ a_2 & b_2 \end{bmatrix}^{-1}\begin{bmatrix} \psi_1 + 2k_1\pi \\ \psi_2 + 2k_2\pi \end{bmatrix}. \quad [4]$$

Substitution into Equation 3 yields a final systems of N−2 equations:

$$\begin{bmatrix} \tilde{k}_3 \\ \tilde{k}_4 \\ \vdots \\ \tilde{k}_N \end{bmatrix}_{k_1 k_2} = \begin{bmatrix} a_3 & b_3 \\ a_4 & b_4 \\ \vdots & \vdots \\ a_N & b_N \end{bmatrix}\begin{bmatrix} a_1 & b_1 \\ a_2 & b_2 \end{bmatrix}^{-1}\begin{bmatrix} \frac{\psi_1}{2\pi} + k_1 \\ \frac{\psi_2}{2\pi} + k_2 \end{bmatrix} - \frac{1}{2\pi}\begin{bmatrix} \psi_1 \\ \psi_2 \\ \vdots \\ \psi_N \end{bmatrix} \quad [5]$$

Therefore, for each of the variables $k_1$ and $k_2$, the associated ambiguity number, $\tilde{k}_n$, that makes the remaining N−2 equations consistent with Equation 4 is determined.

Figure 7:
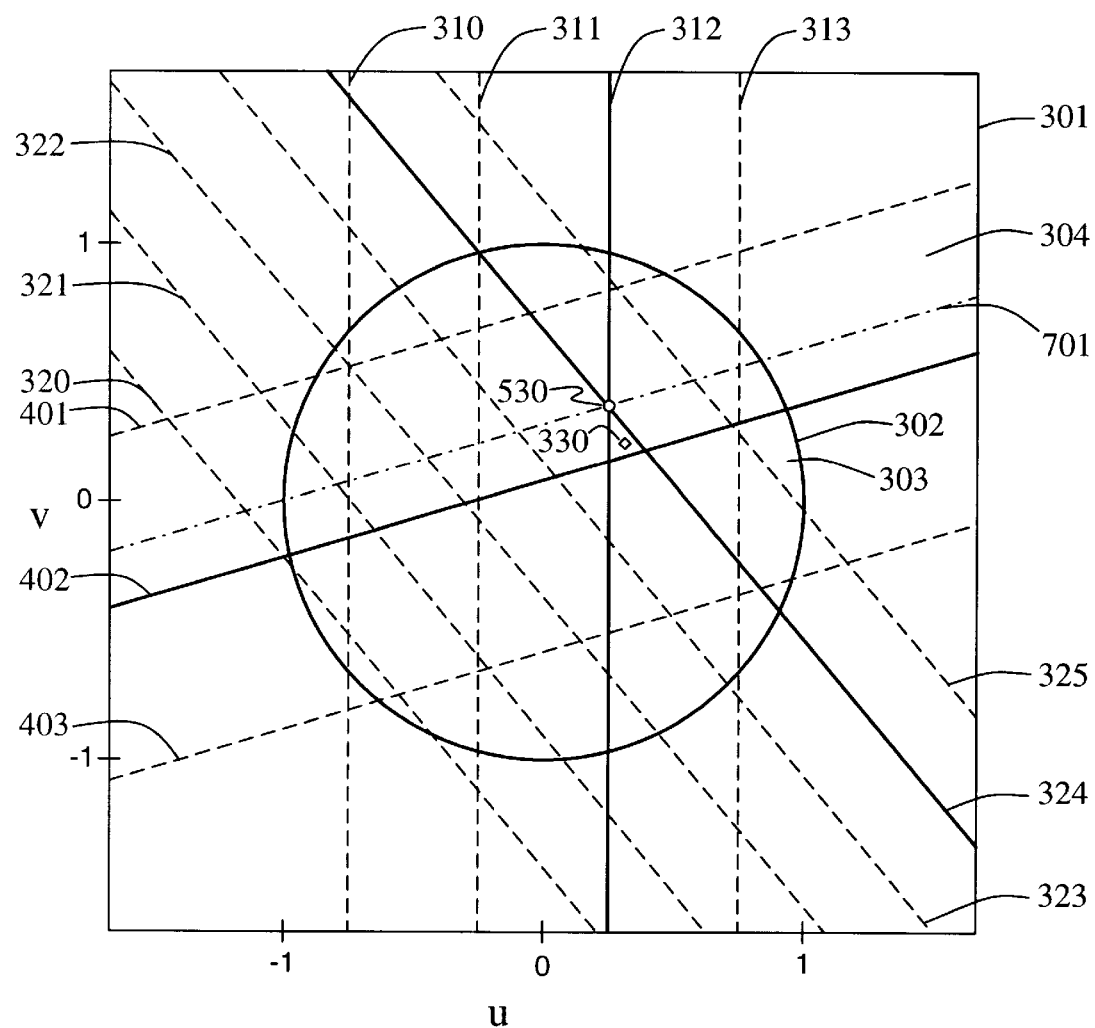
FIG. 7 illustrates the assignment of a permissible solution based upon the intersection of two phase measurements acquired in the presence of noise.

Referring to FIG. 7, the candidate solution corresponding to intersection 530 is assigned to be the conditional solution. Based upon this conditional assignment, line 701 with the ambiguity number, $\tilde{k}_3$, is determined such that the point 530 is a solution to the system of N differential phase equations. Although $\tilde{k}_n$ would ideally be an integer, the presence of noise causes intersection 530 to be displaced from the true solution at intersection 330, and the calculated phase line 701 to be displaced from the measured phase line 402 of FIG. 7. In situations in which the noise is substantial, any of the lines 401 through 403, consecutively inclusive, have a non-zero probability of being the correct phase line. In both the first and second embodiments, the measured phase line that lies closest to the calculated phase line is selected to be the most probable. Line 402 is chosen to be the nearest-neighbor as depicted in block 608. Refering to FIG. 6 again, the nearest-neighbor is determined for each of the groups of lines generated by N−2 phase measurements, as represented by the decision block 609. Upon the completion of block 609 the complete set of conditional ambiguity numbers $k_3$ and $k_N$ corresponding to the nearest-neighbor lines will have been generated.

In the absence of noise the unambiguous set of $k_n$ values must consist entirely of integers. In general, none of the set including $k_3$ through $k_N$ will be integral, except by chance. In order to evaluate the merit of each ambiguous solution one defines a "cost" function with which to measure the likelihood of any particular point coinciding with the one true solution. The cost function, block 610, is common to both the first and second embodiments, although the nature of the cost function in each embodiment is different as described below. The cost function in each case is conditionally evaluated, that is to say, it is calculated as if the given point were the one true solution. Upon completion of decision block 611, the set of ambiguity numbers $k_3$ to $k_N$ and the corresponding cost function are then calculated for each of the permissible combinations of $k_1$ and $k_2$. As discussed above, the assignments of $k_1$ and $k_2$ are necessary because the system of equations is underdetermined. In each of the following embodiments, a cost function is introduced by which the ambiguity may be numerically represented and computationally minimized.

It should be noted that the presence of noise in the differential phase measurement results in two forms of error in the determination of the ambiguity numbers. First, at relatively high signal-to-noise ratios the lines in the cartesian plane 301 are displaced a small distance from their theoretical positions. Where the displacements are small compared to the interline spacing the ambiguity numbers will be determined correctly, but the final calculated angles-of-arrival will contain error that may be estimated using techniques of classic error analysis. On the other hand, where the signal-to-noise ratio is low the error manifests itself as the erroneous selection of one or more ambiguity numbers. Referring to FIG. 7, such erroneous selection occurs for example where the line 401 is in fact the proper ambiguity line, but line 402 is erroneously chosen because it lies closer to intersection 530. This second source of error may be minimized in a multitude of ways. For example, one may retain not only the nearest-neighbor but two or more of the lines that pass closest to intersection 530. In multiple-pulse applications it may also be desirable to process sequential angle-of-arrival estimates in order to minimize the probability of selecting the incorrect ambiguity numbers.

It should be further noted that although one skilled in the art will recognize that any two of the N equations may be selected in block 604 of FIG. 6 for purpose of representing u and v in Equation 4, the particular choice may have an appreciable influence on the efficiency of the computation as well as the accuracy of the final angle-of-arrival determination. For example, the choice to use a family of lines in the cartesian u,v space that produces a dense collection of closely-spaced lines will result in relatively more computation time while the choice to use a coarse collection of lines will produce a relatively less accurate individual estimate of the angles-of-arrival.

Ambiguity Removal Using Tightest Cluster Estimation

The Tightest Cluster Estimation (TCE) is based upon the presumption that the true set of ambiguity numbers $k_1$ to $k_N$ will occur in the region of the cartesian u,v plane where a line from each of the N families of parallel lines produces the most highly focused intersection. As described previously, the values of $k_1$ and $k_2$ are assigned according to the permissible combinations of $k_1$ and $k_2$. The cost function in block 610 of FIG. 6 to be minimized is given by $$Q_{TCE}(k_1, k_2) = \sum_{n=3}^{N} \kappa_n^2 \qquad [6]$$

where $\kappa_n$ represents the difference between the value of $\tilde{k}_n$ derived from Equation 5 ($\tilde{k}_n$ being a real number) and $\hat{k}_n$, where $\hat{k}_n$ is equivalent to $\tilde{k}_n$ rounded to the nearest integer. Rounding to the nearest integer serves to retain the one most probable ambiguity number while excluding from the computation the least probable values. Although there exists a risk of excluding a true ambiguity value, the risk may be reduced by any one of several methods known to those skilled in the art. One such risk-reducing method comprises the steps of acquiring additional phase measurements, weighting the signals according to their respective signal-to-noise ratios, discarding spurious results, and selecting the suitable phase measurements for the application of Equation 4.

Referring to block 611 of FIG. 6, the cost function is calculated for each of the permissible combinations of the values of $k_1$ and $k_2$. In the present invention, the permissible values of $k_1$ and $k_2$ correspond to the candidate solutions in turn corresponding to the allowed intersections residing within the unit circle in the cartesian u,v plane. As shown in block 612, after each of the cost functions is evaluated, the single set of ambiguity numbers minimizing the preceding cost function is selected and used to solve directly for the direction angles. In the alternative, where the system is overdetermined, a maximum likelihood or other pseudo-inverse process may be used to estimate the most probable angles-of-arrival of the incoming signal.

Ambiguity Removal Using Maximum Likelihood Estimation

The Maximum Likelihood Estimation (MLE) is a minimum-variance weighted least square fit. Under the condition of high signal-to-noise ratios, the measurements are approximately represented by Gaussian distributed variables. Where the phase measurements are not correlated and the weights are uniform, the MLE is comparable to a TCE. The Joint Probability Density Function (PDF) to be maximized is therefore given by $$F(u, v, \mathbf{K}) = \frac{1}{(2\pi)^{N/2}(\det \mathbf{M})^{1/2}} \exp\left\{-\frac{1}{2}(\mathbf{x}^T \mathbf{M}^{-1} \mathbf{x})\right\} \qquad [7]$$

in which $$\mathbf{x} = [\mathbf{a} \quad \mathbf{b}]\begin{bmatrix} u \\ v \end{bmatrix} + (\Psi + 2\pi \mathbf{K}) \qquad [8]$$

where x is the measurement noise, $a=(a_1, a_2, \ldots, a_N)^T$, $b=(b_1, b_2, \ldots, b_N)^T$, the corrected phase differences measurement vector $\psi=(\psi_1, \psi_2, \ldots, \psi_N)^T$, and the ambiguity number vector $K=(k_1, k_2, k_3, \ldots, k_N)^T$.

Here, M represents the covariance matrix defined as $E[\psi\psi^T]E[\psi]E[\psi^T]$ in which $E[.]$ denotes the expectation value. Where for example the array is composed of co-polarized elements from which independent differential phase measurements are acquired, one would expect the covariance matrix to be diagonal. In contrast, one would expect a degree of correlation where simultaneous differential phase measurements are acquired using any one single element used in conjunction with two other elements; such combination of measurements resulting in a non-diagonal covariance matrix. In addition, the covariance matrix should account for variation in the signal-to-noise ratio between different elements by weighting the measurements in inverse proportion to the measured powers. Variation in the signal strength is presumed in the case of a polarization-diverse antenna array. In either case, the covariance matrix is constructed based upon empirical data where multiple samples are acquired over time. Where one cannot presume that the measured signal is constant over time, one reconstructs the covariance matrix based upon the signals acquired from a single time measurement with knowledge of the particular pairs of antennas used and the amplitude of the measured signals.

Maximization of Equation 7 is equivalent to minimizing $Q_{MLE}(u,v;K)=x^T M^{-1} x$, hereafter referred to as the MLE cost function as depicted in block 610 of FIG. 6. By setting the partial derivatives with respect to u and v of the MLE cost function, namely $\partial Q_{MLE}(u,v)/\partial u$ and $\partial Q_{MLE}(u,v)/\partial v$, equal to zero, the following relationship may be derived:

$$\begin{bmatrix} u \\ v \end{bmatrix} = -C^{-1} \begin{bmatrix} a^T \\ b^T \end{bmatrix} M^{-1}(\Psi + 2\pi K) \quad [9]$$

where $$C^{-1} = \frac{-1}{a^T M^{-1} a\, b^T M^{-1} b - a^T M^{-1} b\, b^T M^{-1} a} \begin{bmatrix} b^T M^{-1} b & -a^T M^{-1} b \\ -b^T M^{-1} a & a^T M^{-1} a \end{bmatrix} \quad [10]$$

The motivation for taking the partial derivatives is to yield a MLE cost function that is inherently a function of the optimized angles-of-arrival, i.e., the best estimate of the direction angles based upon the ambiguity numbers, $k_1$ and $k_2$ in addition to $\hat{k}_3$ through $\hat{k}_n$ generated from the nearest-neighbor determination. Under ideal circumstances, optimized angles-of-arrival will coincide with the true angles-of-arrival represented by intersection 330. Substituting Equation 9 into Equation 8 produces the result $$Q_{MLE}(K) = (\psi + 2\pi K)^T H (\psi + 2\pi K) \quad [11]$$

where $$H = M^{-1} - M^{-1} [a\ b] C^{-1} \begin{bmatrix} a^T \\ b^T \end{bmatrix} M^{-1} \quad [12]$$

H is a positive semidefinite matrix with a rank of N-2 due to the fact that the original system of equations was underdetermined by two equations. Therefore, a unique solution to H is determined where two unknown values of $k_n$ are assigned (This process is equivalent to solving for the balance of the K elements in Equation 5 where the values of $k_1$ and $k_2$ are already assigned). With $k_1$ and $k_2$ assigned, the MLE cost function derived from the joint PDF in Equation 7 is then evaluated using $K=(k_1,k_2,\hat{k}_3,\ldots,\hat{k}_N)^T$ where $\hat{k}_n$ is equivalent to $\hat{k}_n$ rounded to the nearest integer. As indicated by decision block 611 of FIG. 6, the cost function is then determined for each assignment of $k_1$ and $k_2$. As a final step, the angles-of-arrival are determined, as shown in block 613, with Equation 9 using the K that minimizes the cost function selected in block 612.

Note that under some conditions it may be desirable to retain one or more of the possible ambiguity numbers that are summarily excluded with the rounding of $\hat{k}_n$ to the nearest integer. By reserving not only the nearest integer but include the nearest two or three integers, one may construct additional ambiguity number vectors of the form $K=(k_1,k_2,\hat{k}_3\pm 1,\ldots,\hat{k}_N)^T$ through $K=(k_1,k_2,\hat{k}_3,\ldots,\hat{k}_N\pm 1)^T$. In the cases of low signal-to-noise ratios, retention of the extra results in a greater degree of accuracy. Such a technique is applicable to both the MLE and TCE methods.

Ambiguity Removal Using Voltage Comparison Estimation

Figure 8:
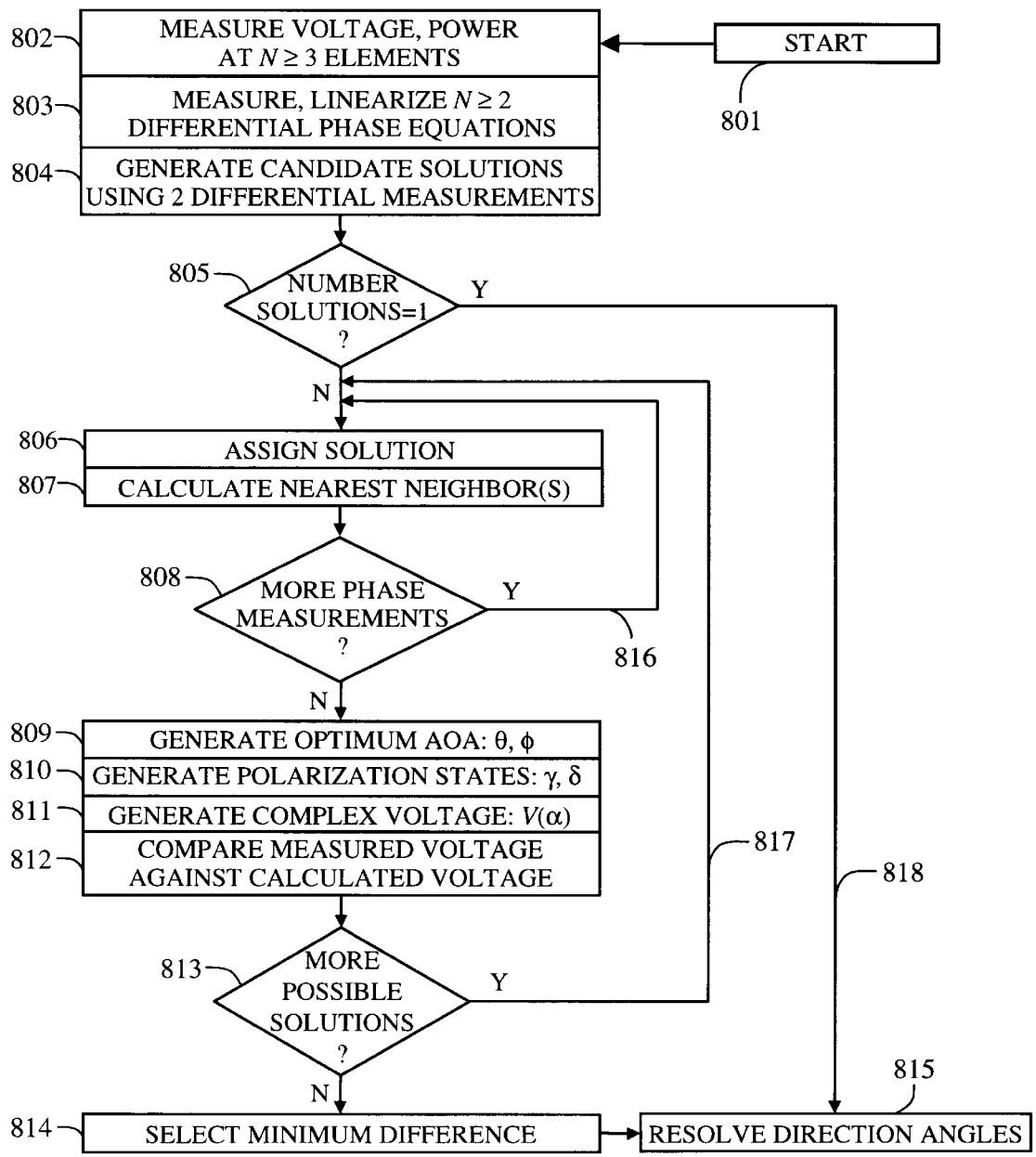
FIG. 8 is a flow chart of the Voltage Comparison Estimation process according to the present invention for removing the angular ambiguity in the determination of the angles-of-arrival.

The third embodiment of the method for ambiguity removal, the Voltage Comparison Estimation (VCE) method, is illustrated in FIG. 8. The VCE uses both phase and amplitude information in order to remove the angular ambiguity in the angles-of-arrival for a polarization diverse antenna system. The VCE test is a measure of the self-consistency of a direct voltage measurement with that of a reconstructed voltage based indirectly upon the measurement of the power of the incoming signal at each detector as well as the angles-of-arrival determined from a candidate solution.

As a first step, the VCE method begins in block 802 with the acquisition of the amplitude and phase of the measured voltage, in addition to the power, typically by three or more antenna elements. Unlike the previously described embodiments, the VCE can be executed with a minimum of two differential phase measurements, but for more accuracy more measurements are preferable. The derivation of the differential phase measurements is illustrated in block 803. Blocks 804 through 808 are entirely analogous to that of the steps detailed in blocks 604 through 609 of FIG. 6. The only notable difference being that block 807 is eliminated where the number of differential phase equations is specifically equal to two. Upon completion of decision block 808, where the question posed is answered in the negative, the ambiguity numbers corresponding to one particular assignment of $k_1$ and $k_2$ will have been determined. In contrast to the MLE method, the optimized direction angles are calculated for each ambiguous solution in the VCE. As shown previously, the angles-of-arrival are calculated using Equation 9. As discussed above, the optimized direction angle does not coincide with the intersection 530 but with the optimized angle-of-arrival. The optimized angle-of-arrival is the product of the maximum likelihood approach where the inclusion of redundant measurements makes it possible to determine a best estimate of the true angles-of-arrival.

The polarization of the incoming wave is described by two emitter polarization angles, $\gamma$ and $\delta$, as well as the electric field strength. The instantaneous electric field contained in a plane perpendicular to the direction of the incoming wave is E. In an arbitrary Cartesian reference frame with axes x and y and unit vectors $\hat{x}$ and $\hat{y}$, E can be expressed as $$E = E_x \cos(\omega t)\hat{x} + E_y \cos(\omega t + \delta)\hat{y} \quad [13]$$

where $\delta$ is the phase by which the y-component leads the x-component, $\omega$ is the oscillatory frequency of the electrical field and the angle $\gamma$ describes the relative values of $E_x$ and $E_y$ as follows:

$$\gamma = \arctan(E_y/E_x) \text{ for } 90 \leq \gamma \leq 0 \text{ degrees.} \quad [14]$$

Referring to FIG. 8 again, in block 810 the polarization angles of the emitter source are determined as a function of $\theta$ and $\phi$ as well as the power coefficients $a_p$, $b_p$, and $c_p$, as derived in the pending patent Ser. No. 09/023,381, for each of the permissible pair of direction angles using the following relationships:

$$\Gamma_R = \frac{b_p \sin(2\phi) - c_p \cos(2\phi)}{a_p + b_p \cos(2\phi) + c_p \sin(2\phi)} \cos(\theta) \quad [15.1]$$

and

-continued $$\Gamma_l = \frac{\pm\sqrt{a_p^2 + b_p^2 + c_p^2}}{a_p + b_p\cos(2\phi) + c_p\sin(2\phi)}\cos(\theta) \quad [15.2]$$

Here, $\Gamma$ is the polarization state of the emitter written in complex form, and given by $$\Gamma = \Gamma_R + j\Gamma_I = \tan(\gamma)e^{j\delta}. \quad [16]$$

After calculating the polarization angles each member of the set of estimates $\theta_n$, $\phi_n$, $\gamma_n$, $\delta_n$, the corresponding complex voltage, $v(\alpha)$, is computed in block 811 for each of the radiation sensing elements using the following relationship;

$$V(\alpha) = V_0 \exp\left(j\frac{2\pi R}{\lambda}\sin\theta\cos(\phi - \alpha)\right)(\cos\theta\cos(\phi - \alpha) + \Gamma\sin(\phi - \alpha)) \quad [17]$$

where the overall constant signal strength, $V_0$, is measured. There is a reconstructed complex voltage for each of the N antenna elements associated with each possible pair of direction angles calculated in block 809.

In block 812, the antenna voltages reconstructed in block 811 is compared with the corresponding set of measured complex voltages. This comparison is made for each of the candidate solutions upon completion of block 813. The set of complex voltages differing the least from the direct measured voltages is selected in block 814 to correspond to the unambiguous angles-of-arrival and polarization angles designated in block 815. One method of determining the minimum difference is taking the difference of the phasor representations of the measured voltage with the reconstructed voltage. The sum of the square of the modulus of the differences is then a numerical standard by which the voltages for each of the ambiguous solutions may be compared. The most probable angles-of-arrival therefore correspond to the $\theta$ and $\phi$ that produce the reconstructed voltage differing the least from the measured voltages.

Although the description above contains many specifications, these should not be construed as limiting the scope of the invention but as merely providing illustrations of some of the presently preferred embodiments of this invention.

Therefore, the invention has been disclosed by way of example and limitation, and reference should be made to the following claims to determine the scope of the present invention.

We claim:

1. A method using a plurality of RF sensing devices configured as an array for determining an unambiguous pair of direction angles that characterize a relative orientation of a unique RF signal source with respect to the array of RF sensing devices, the method comprising the steps of:
    (a) determining a wavelength of the unique RF signal source;
    (b) acquiring three or more independent differential phase measurements of said RF signal source, whereby a total of N independent differential phase relationships are formed;
    (c) generating from the wavelength and the three or more independent differential phase measurements acquired in step 1(b), a set of ambiguity number vectors where each ambiguity number vector corresponds to an ambiguous pair of direction angles falling within an effective field of view of the array of RF sensing devices;
    (d) selecting an ambiguity number vector maximizing a joint probability density function; said joint probability function yielding minimum variance weighted least square estimates as a function of the vectors of step 1(c); and
    (e) resolving the unambiguous pair of direction angles from the vector selected in step 1(d).

2. The method as defined in claim 1, wherein the step of acquiring three or more independent differential phase measurements of said unique RF signal source further includes compensating the three or more independent differential phase measurements for polarization diversity effects.

3. A method using a plurality of RF sensing devices configured as an array for determining an unambiguous pair of direction angles that characterize a relative orientation of a unique RF signal source with respect to the array of RF sensing devices, the method comprising the steps of:
    (a) determining a wavelength of the unique RF signal source;
    (b) acquiring three or more independent differential phase measurements of said unique RF signal source, whereby a total of N independent differential phase relationships are formed; each of the N phase relationships being a function of an ambiguity number;
    (c) generating from the wavelength and a combination of any two of the three or more independent differential phase measurements acquired in step 3(b), a set of candidate solutions for the relative orientation of the array of RF sensing devices with respect to the unique RF signal source where each candidate solution within the set of candidate solutions corresponds to an ambiguous pair of direction angles falling within the field of view of the array of RF sensing devices, whereby two ambiguity numbers are associated with each of the candidate solutions;
    (d) deriving from those differential phase measurements not used in generating the set of candidate solutions in step 3(c), the remaining N−2 ambiguity numbers conditioned upon the assigned ambiguity numbers associated with the candidate solutions generated in step 3(c) wherein union of the ambiguity numbers associated with each of said N differential phase measurements form complete ambiguity number vectors;
    (e) selecting an ambiguity number vector maximizing a joint probability density function; said joint probability density function yielding minimum variance weighted least square estimates where each of said estimates is generated as a function of one of said ambiguity number vectors of step 3(d); and
    (f) resolving the unambiguous pair of direction angles of the unique RF signal source based upon the ambiguity number vector selected in step 3(e).

4. The method as defined in claim 3, wherein the step of acquiring three or more independent differential phase measurements of said unique RF signal source further includes compensating the three or more independent differential phase measurements for polarization diversity effects.

5. A method using a plurality of RF sensing devices configured as an array for determining the unambiguous pair of direction angles that characterize the relative orientation of a unique RF signal source with respect to the array of RF sensing devices, the method comprising the steps of:
    (a) determining a wavelength of the unique RF signal source;
    (b) acquiring three or more independent differential phase measurements of said unique RF signal source, whereby a total of N independent differential phase equations are formed; each of the N phase relationships being a function of an ambiguity number; each of the ambiguity numbers being associated with a group of one or more phase lines;

(c) generating from the wavelength and a combination of any two of the three or more independent differential phase measurements acquired in step 5(b), a set of candidate solutions for a relative orientation of the array of RF sensing devices with respect to the unique RF signal source where each candidate solution of the set of candidate solutions corresponds to an ambiguous pair of direction angles falling within the field of view of the array of RF sensing devices, whereby two ambiguity numbers are associated with each of the candidate solutions;

(d) generating a complete combination of ambiguity numbers for each candidate solution generated in step 5(c), the step further comprising the steps of:

(1) deriving from those differential phase measurements not used in generating the set of candidate solutions in step 5(c), the remaining N−2 ambiguity numbers associated with phase lines characterized by a minimal displacement between said phase line and a particular candidate solution, whereby a nearest-neighbor is selected from each group of phase lines; and (2) repeating step 5(d)(1) for each solution of the set of candidate solutions generated in step 5(c);

(e) selecting the candidate solution maximizing a joint probability density function; said joint probability function yielding minimum variance weighted least square estimates where each of said estimates is a function of the complete combination of ambiguity numbers of step 5(d) corresponding to each of said candidate solutions of step 5(c); and (f) resolving an unambiguous pair of direction angles of the unique RF signal source based upon the candidate solution selected in step 5(e).

6. The method as defined in claim 5, wherein the step of acquiring three or more independent differential phase measurements of said unique RF signal source further includes compensating the three or more independent differential phase measurements for polarization diversity effects.

7. A method using a plurality of RF sensing devices configured as an array for determining the unambiguous pair of direction angles that characterize the relative orientation of a unique RF signal source with respect to the array of sensing devices, the method comprising the steps of:

(a) determining a wavelength of the unique RF signal source;

(b) acquiring three or more independent differential phase measurements of said RF signal source, whereby a total of N independent differential phase equations are formed; each of the N phase relationships being a function of an ambiguity number; each of the ambiguity numbers being associated with a group of one or more phase lines;

(c) generating from the wavelength and a combination of any two of the three or more independent differential phase measurements acquired in step 7(b), a set of candidate solutions for a relative orientation of the array of radiation sensing elements and the unique RF signal source where each candidate solution within the set of candidate solutions corresponds to an ambiguous pair of direction angles falling within the effective field of view of the array of radiation sensing devices, whereby two ambiguity numbers are associated with each of the candidate solutions;

(d) generating the tightest cluster estimation cost function corresponding to each candidate solution of the set of candidate solutions, the step further comprising the steps of:

(1) generating the complete combination of ambiguity numbers from those differential phase measurements not part of the combination used in step 7(c), the remaining N−2 ambiguity numbers corresponding to phase lines characterized by a minimal displacement between said phase line and the candidate solution, whereby the nearest-neighbor is selected from each group of phase lines; and (2) deriving the sum of the square of the displacements of step 7(d)(1);

(e) selecting the candidate solution minimizing the tightest cluster estimation cost function as the unique solution; said cost function yielding least square estimates wherein each of said estimates is a function of the complete combination of ambiguity numbers of step 7(d)(1) corresponding to each of said candidate solutions of step 7(c); and (f) resolving the unambiguous pair of direction angles of the unique RF signal source based upon the selected unique solution.

8. The method as defined in claim 7, wherein the step of acquiring three or more independent differential phase measurements of said unique RF signal source further includes compensating the three or more independent differential phase measurements for polarization diversity effects.

9. A method using a plurality of polarization-diverse RF sensing devices configured as an array for determining the unambiguous pair of direction angles that characterize the relative orientation of a unique RF signal source with respect to the array of sensing devices, the method comprising the steps of:

(a) converting the incoming RF signal into a complex voltage at each of the plurality of polarization-diverse sensing devices;

(b) determining a measured signal power of the incoming signal corresponding to each of the sensing devices;

(c) determining a wavelength of the unique RF signal;

(d) determining two independent differential phase relationships between selected pairs of sensing devices;

(e) determining candidate solutions for a relative orientation of the array of RF sensing devices and the unique RF signal source from the wavelength of step 9(c) and the two differential phase relationships of step 9(d), where each candidate solution within the set of candidate solutions corresponds to an ambiguous pair of direction angles falling within the field of view of the array of RF sensing devices;

(f) determining the direction angles based upon each candidate solution within the set of candidate solutions determined in step 9(e);

(g) determining the polarization angles of the unique RF signal based upon the signal powers and the direction angles calculated in step 9(f) for each candidate solution;

(h) deriving a reconstructed complex voltage for each ambiguous pair of direction angles based upon the wavelength, and the direction angles determined in step 9(f), and the polarization angles of step 9(g);

(i) calculating the difference between the reconstructed voltages and the measured voltages at each of the candidate solutions; and (j) selecting as the unambiguous angles-of-arrival the pair of direction angles associated with the reconstructed voltage that minimizes the difference of step 9(i).

10. A method using a plurality of RF sensing devices with a variety of known yet diverse polarizations configured as an array for determining the unambiguous pair of direction angles that characterize the relative orientation of a unique RF signal source with respect to the array of sensing devices, the method comprising the steps of:

(a) converting the incoming RF signal into a voltage at each of a plurality of polarization-diverse sensing devices;

(b) determining a signal power of the incoming signal corresponding to each of the sensing devices;

(c) determining a wavelength of the unique RF signal;

(d) determining three or more independent differential phase measurements between selected pairs of polarization-diverse elements;

(e) determining from the wavelength of step 10(c) and any two of the three or more differential phase measurements determined in step 10(d), a set of candidate solutions for a relative orientation of the array of RF sensing elements and the unique RF signal source, where each candidate solution within the set of candidate solutions corresponds to an ambiguous pair of direction angles falling within the field of view of the array of RF sensing devices;

(f) estimating the pair of direction angles for each of the candidate solutions using a pseudo-inverse process based upon the three or more differential phase measurements of step 10(d);

(g) determining the polarization angles of the unique RF signal based upon the signal power and the direction angles of step 10(f) for each candidate solution;

(h) deriving a reconstructed voltage at each sensing device for each candidate solution based upon the wavelength, and the estimated direction angles determined in step 10(f), and the polarization angles of step 10(g);

(i) calculating the difference between the reconstructed voltages and the measured voltages; and (j) selecting as the unambiguous directions angles the pair of direction angles associated with the reconstructed voltage that minimizes the difference of step 10(i).

11. A method using a plurality of RF sensing devices configured as an array for determining an unambiguous pair of direction angles that characterize a relative orientation of a unique RF signal source with respect to the array of RF sensing devices, the method comprising the steps of:

(a) determining a wavelength of the unique RF signal source;

(b) acquiring three or more independent differential phase measurements of said RF signal source, whereby a total of N independent linear differential phase relationships given by $$a_n u + b_n v + \psi_n + 2k_n \pi = 0 \text{ for } n=1,2,\ldots N$$

are formed;

(c) generating from the wavelength and the three or more independent differential phase measurements, a set of ambiguity number vectors where each ambiguity number vector of the form $$K=(k_1,k_2,k_3,\ldots,k_N)^T$$

corresponds to an ambiguous pair of direction angles falling within a field of view of the array of RF sensing devices;

(d) selecting an ambiguity number vector maximizing a joint probability density function; said joint probability function yielding minimum variance weighted least square estimates as a function of the ambiguity number vectors; and (e) resolving the unambiguous pair of direction angles from the selected ambiguity number vector; said direction angles being related to a pair of direction cosines given by $$\begin{bmatrix} u \\ v \end{bmatrix} = -\mathbf{C}^{-1} \begin{bmatrix} \mathbf{a}^T \\ \mathbf{b}^T \end{bmatrix} \mathbf{M}^{-1}(\Psi + 2\pi \mathbf{K})$$

where $$\mathbf{C}^{-1} = \frac{-1}{\mathbf{a}^T\mathbf{M}^{-1}\mathbf{a}\,\mathbf{b}^T\mathbf{M}^{-1}\mathbf{b} - \mathbf{a}^T\mathbf{M}^{-1}\mathbf{b}\,\mathbf{b}^T\mathbf{M}^{-1}\mathbf{a}} \begin{bmatrix} \mathbf{b}^T\mathbf{M}^{-1}\mathbf{b} & -\mathbf{a}^T\mathbf{M}^{-1}\mathbf{b} \\ -\mathbf{b}^T\mathbf{M}^{-1}\mathbf{a} & \mathbf{a}^T\mathbf{M}^{-1}\mathbf{a} \end{bmatrix}.$$

12. The method as defined in claim 11, wherein the step of acquiring three or more independent differential phase measurements of said unique RF signal source further includes compensating the three or more independent differential phase measurements for polarization diversity effects.

13. A method using a plurality of RF sensing devices configured as an array for determining an unambiguous pair of direction angles that characterize a relative orientation of a unique RF signal source with respect to the array of RF sensing devices, the method comprising the steps of:

(a) determining a wavelength of the unique RF signal source;

(b) acquiring three or more independent differential phase measurements of said unique RF signal source, whereby a total of N independent linear differential phase relationships given by $$a_n u + b_n v + \psi_n + 2k_n \pi = 0 \text{ for } n=1, 2,\ldots N$$

are formed; each of the N phase relationships being a function of an ambiguity number;

(c) generating from the wavelength and any combination of two of the three or more independent differential phase measurements acquired in step 13(b), a set of candidate solutions for the relative orientation of the array of RF sensing devices with respect to the unique RF signal source where each candidate solution within the set of candidate solutions corresponds to an ambiguous pair of direction angles falling within the field of view of the array of RF sensing devices; each candidate solution related to a pair of direction angles given by $$\begin{bmatrix} u \\ v \end{bmatrix}_{k1,k2} = -\begin{bmatrix} a_1 & b_1 \\ a_2 & b_2 \end{bmatrix}^{-1} \begin{bmatrix} \psi_1 + 2k_1\pi \\ \psi_2 + 2k_2\pi \end{bmatrix},$$

whereby two ambiguity numbers are associated with each of the candidate solutions;

(d) deriving from those differential phase measurements not used in generating the set of candidate solutions in step 13(c), the remaining N−2 ambiguity numbers conditioned upon the assigned ambiguity numbers associated with the candidate solutions generated in step 13(c) wherein union of the ambiguity numbers associated with the candidate solutions with the ambiguity numbers of step 13(d) form complete ambiguity number vectors including $K=(k_1, k_2, \hat{k}_3+i, \ldots, \hat{k}_N+j)^T$ where i and j assume integer values falling within the range corresponding to groups of phase lines that fall within a specifiable field of view of the array;

(e) selecting an ambiguity number vector maximizing a joint probability density function; said joint probability density function yielding minimum variance weighted least square estimates where each of said estimates is generated as a function of one of said ambiguity number vectors of step 13(d); and (f) resolving the unambiguous pair of direction angles from the selected ambiguity number vector; said direction angles being related to a pair of direction cosines given by $$\begin{bmatrix} u \\ v \end{bmatrix} = -\mathbf{C}^{-1} \begin{bmatrix} \mathbf{a}^T \\ \mathbf{b}^T \end{bmatrix} \mathbf{M}^{-1}(\Psi + 2\pi \mathbf{K})$$

where $$\mathbf{C}^{-1} = \frac{-1}{\mathbf{a}^T \mathbf{M}^{-1}\mathbf{a}\, \mathbf{b}^T \mathbf{M}^{-1}\mathbf{b} - \mathbf{a}^T \mathbf{M}^{-1}\mathbf{b}\, \mathbf{b}^T \mathbf{M}^{-1}\mathbf{a}} \begin{bmatrix} \mathbf{b}^T \mathbf{M}^{-1}\mathbf{b} & -\mathbf{a}^T \mathbf{M}^{-1}\mathbf{b} \\ -\mathbf{b}^T \mathbf{M}^{-1}\mathbf{a} & \mathbf{a}^T \mathbf{M}^{-1}\mathbf{a} \end{bmatrix}.$$

14. The method as defined in claim 13, wherein the method further includes the step of compensating the three or more independent differential phase measurements for the effects of polarization diversity prior to the step of forming N independent differential phase relationships.

15. A method using a plurality of RF sensing devices configured as an array for determining the unambiguous pair of direction angles that characterize the relative orientation of a unique RF signal source with respect to the array of RF sensing devices, the method comprising the steps of:

(a) determining a wavelength of the unique RF signal source;

(b) acquiring three or more independent differential phase measurements of said unique RF signal source, whereby a total of N independent linear differential phase relationships given by $$a_n u + b_n v + \psi_n + 2k_n\pi = 0 \text{ for } n=1, 2, \ldots N$$

are formed; each of the N phase relationships being a function of an ambiguity number; each of the ambiguity numbers being associated with a group of one or more phase lines;

(c) generating from the wavelength and a combination of any two of the three or more independent differential phase measurements acquired in step 15(b), a set of candidate solutions for a relative orientation of the array of RF sensing devices with respect to the unique RF signal source where each candidate solution of the set of candidate solutions corresponds to an ambiguous pair of direction angles falling within the field of view of the array of RF sensing devices; each candidate solution related to a pair of direction cosines given by $$\begin{bmatrix} u \\ v \end{bmatrix}_{k1,k2} = -\begin{bmatrix} a_1 & b_1 \\ a_2 & b_2 \end{bmatrix}^{-1} \begin{bmatrix} \psi_1 + 2k_1\pi \\ \psi_2 + 2k_2\pi \end{bmatrix},$$

whereby two ambiguity numbers are associated with each of the candidate solutions;

(d) generating a complete combination of ambiguity numbers for each candidate solution generated in step 15(c), the step further comprising the steps of:

(1) deriving from those differential phase measurements not used in generating the set of candidate solutions in step 15(c), the remaining N−2 ambiguity numbers associated with phase lines characterized by a minimal displacement between said phase line and a particular candidate solution, whereby a nearest-neighbor to the particular candidate solution is selected from each group of phase lines; and (2) repeating step 15(d)(1) for each solution of the set of candidate solutions generated in step 15(c);

(e) selecting the candidate solution maximizing a joint probability density function; said joint probability function yielding minimum variance weighted least square estimates where each of said estimates is a function of the complete combination of ambiguity numbers of step 15(d) corresponding to each of said candidate solutions of step 15(c); and (f) resolving an unambiguous pair of direction angles of the unique RF signal source based upon the candidate solution selected in 15(e); said direction angles being related to the direction cosines given by $$\begin{bmatrix} u \\ v \end{bmatrix} = -\mathbf{C}^{-1} \begin{bmatrix} \mathbf{a}^T \\ \mathbf{b}^T \end{bmatrix} \mathbf{M}^{-1}(\Psi + 2\pi \mathbf{K})$$

where $$\mathbf{C}^{-1} = \frac{-1}{\mathbf{a}^T \mathbf{M}^{-1}\mathbf{a}\, \mathbf{b}^T \mathbf{M}^{-1}\mathbf{b} - \mathbf{a}^T \mathbf{M}^{-1}\mathbf{b}\, \mathbf{b}^T \mathbf{M}^{-1}\mathbf{a}} \begin{bmatrix} \mathbf{b}^T \mathbf{M}^{-1}\mathbf{b} & -\mathbf{a}^T \mathbf{M}^{-1}\mathbf{b} \\ -\mathbf{b}^T \mathbf{M}^{-1}\mathbf{a} & \mathbf{a}^T \mathbf{M}^{-1}\mathbf{a} \end{bmatrix}.$$

16. The method as defined in claim 15, wherein the step of acquiring three or more independent differential phase measurements of said unique RF signal source further includes compensating the three or more independent differential phase measurements for polarization diversity effects.

* * * * *